(12) United States Patent
Kahlon et al.

(10) Patent No.: US 10,377,466 B2
(45) Date of Patent: Aug. 13, 2019

(54) FOLDABLE WINGS FOR AN UNMANNED AERIAL VEHICLE

(71) Applicant: UVISION AIR LTD, Zur Igal (IL)

(72) Inventors: Moshe Kahlon, Kfar Yona (IL); Amit Morag, Rosh Haayin (IL)

(73) Assignee: UVISION AIR, LTD., Zur Igal (IL)

( * ) Notice: Subject to any disclaimer, the term of this patent is extended or adjusted under 35 U.S.C. 154(b) by 0 days.

(21) Appl. No.: 15/755,669

(22) PCT Filed: Aug. 25, 2016

(86) PCT No.: PCT/IL2016/050935
§ 371 (c)(1),
(2) Date: Feb. 27, 2018

(87) PCT Pub. No.: WO2017/037698
PCT Pub. Date: Mar. 9, 2017

(65) Prior Publication Data
US 2019/0023374 A1    Jan. 24, 2019

(30) Foreign Application Priority Data

Sep. 6, 2015    (IL) .......................................... 241201

(51) Int. Cl.
*B64C 3/56*        (2006.01)
*F42B 10/14*       (2006.01)
*B64C 39/02*       (2006.01)

(52) U.S. Cl.
CPC .............. *B64C 3/56* (2013.01); *B64C 39/024* (2013.01); *F42B 10/14* (2013.01);
(Continued)

(58) Field of Classification Search
CPC ....... B64C 3/56; B64C 5/12; B64C 2201/021; B64C 2201/102; B64C 2201/201; B64C 2201/08; B64C 2201/203
See application file for complete search history.

(56) References Cited

U.S. PATENT DOCUMENTS 3,063,375 A    11/1962   Hawley et al.
4,667,899 A *  5/1987    Wedertz .................. F42B 10/14
                                                      244/218
(Continued)

FOREIGN PATENT DOCUMENTS

CN          101652286         2/2010

*Primary Examiner* — Richard G Davis
(74) *Attorney, Agent, or Firm* — Law Offices of Steven W. Weinrieb

(57) ABSTRACT

An unmanned air vehicle (UAV) having a fuselage, a foldable propulsion means to generate thrust leading to the UAV movement, a driving means to drive the propulsion means and a plurality of flight control surfaces actuators are further included. The UAV further includes at least one pair of foldable wings where the rear portion of the wings is pivotally attached to the fuselage. The wings having at least one roll control surface hinged to at least one of the foldable wings. At least a pair of tail stabilizers having ruddervators flight control surfaces hinged to the tail stabilizers. In a fully extended position or in ready to fly state position, each of the foldable wings are deployed perpendicular to one another and perpendicular to the fuselage to form an offset-x shaped wings, and in a stowed position, each of the wings are positioned parallel to one another and positioned parallel to the fuselage.

14 Claims, 5 Drawing Sheets

(52) U.S. Cl.
CPC .... *B64C 2201/021* (2013.01); *B64C 2201/08* (2013.01); *B64C 2201/102* (2013.01); *B64C 2201/201* (2013.01); *B64C 2201/203* (2013.01)

(56) References Cited

U.S. PATENT DOCUMENTS

| | | | |
|---|---|---|---|
| 5,078,339 A | | 1/1992 | Lapidot |
| 5,108,051 A | * | 4/1992 | Montet ............... F42B 10/14 |
| | | | 244/3.28 |
| 8,444,082 B1 | * | 5/2013 | Foch ..................... B64C 3/10 |
| | | | 244/49 |
| 2006/0255205 A1 | * | 11/2006 | Gleich ............... B64C 39/024 |
| | | | 244/49 |
| 2007/0152098 A1 | | 7/2007 | Sheahan, Jr. et al. |
| 2010/0065288 A1 | * | 3/2010 | Akcasu ................ A62C 3/025 |
| | | | 169/53 |
| 2010/0282917 A1 | | 11/2010 | O'Shea |
| 2011/0226174 A1 | * | 9/2011 | Parks ..................... B60F 5/02 |
| | | | 114/313 |
| 2012/0017795 A1 | | 1/2012 | Dryer et al. |
| 2012/0025009 A1 | | 2/2012 | Geswender et al. |
| 2013/0099049 A1 | * | 4/2013 | Reany ..................... B64C 3/56 |
| | | | 244/46 |
| 2016/0097618 A1 | | 4/2016 | Carlson et al. |
| 2016/0121992 A1 | * | 5/2016 | Saroka ................... B64C 1/14 |
| | | | 244/129.4 |
| 2018/0086454 A1 | * | 3/2018 | Cook .................. B64C 39/024 |

\* cited by examiner

FOLDABLE WINGS FOR AN UNMANNED AERIAL VEHICLE

FIELD OF THE INVENTION

The present invention relates to a lightweight unmanned air vehicle (UAV), more particularly the present invention relates to collapsible and/or foldable wings, tail, propeller and control surfaces positioned on the UAV's fuselage.

BACKGROUND OF THE INVENTION

An unmanned air vehicle (UAV) control system typically includes a UAV (commonly known as a drone) and a ground station for controlling operation of the UAV.

The UAV further typically includes an airframe, which include fuselage and wings attached to the fuselage and include control surfaces pivotally attached to the wings. The UAV may include a propulsion device for propelling the UAV. The UAV may include stabilizers and control surfaces pivotally attached to the stabilizers.

A foldable and/or collapsible UAV wings, control surfaces and propeller are desirable for example to decrease the bulk of the UAV before use. Such issues are addressed for example in US2006255205, GB2434783 and CN102837820.

US2006255205 discloses a small aircraft having a fuselage (airframe), control apparatus, and a drive. A propeller electric drive, a power supply, a TV camera, data transmission and steering electronics, and a warhead and/or a weapon system are integrated in the fuselage. Collapsible and/or foldable wings, control surfaces, and propellers are positioned on the fuselage. The small aircraft may be equipped with different weapon systems for combating different targets or for different missions.

GB2434783 discloses an aircraft having two wings which are vertically displaced. The fuselage on which the wings are mounted may be in the form of a tube or canister from which a portion has been removed to accommodate the wings when folded. The aircraft may be a tube-launched Unmanned Air Vehicle, or an aircraft intended to be stored in close proximity to other aircraft.

CN102837820 discloses a small-size wing-foldable unmanned aerial vehicle with a Z-shaped wing layout, which comprises a left front wing, a left aileron, a front elevator, a left front wing folding/unfolding mechanism, a front fairing, a vehicle body, a power device, a rear elevator, a right aileron, a right rear wing, a left vertical fin, a left rudder, a left vertical fin folding/unfolding mechanism, a rear fairing, a right rear wing folding/unfolding mechanism, a right vertical fin, a right rudder and a right vertical fin folding/unfolding mechanism.

Folding wings or fins of an air craft missile and/or a projectile is addressed for example in EP0251890 and U.S. Pat. No. 5,108,051.

EP0251890 discloses an aircraft missile to be fitted with multiple-folding wings in such a way as to reduce the bulk of the missile before use when the wings are retracted. The wing consists of a first primary wing unfolding with respect to the body of the missile along an axis parallel to the longitudinal axis of the body. The wing has a secondary wing housed inside the primary wing and pivoting about an axis perpendicular to the axis of the first pivoting and perpendicular to the primary wing. A tertiary wing is also provided, housed inside the secondary wing and pivoted in the same way as the secondary wing at its end in such a way as to increase the lifting surface of the unfolded wing. In the retracted position, the wings are folded against the body of the aircraft missile.

U.S. Pat. No. 5,108,051 discloses a mechanism for attaching a fin to a projectile and for deploying the fin from a stowed position to a deployed position. In the stowed position the fin is parallel to a centrally located axis which extends from the front portion to the rear portion of the projectile. A mounting which is disposed in a bearing and to which the fin is attached permits pivoting of the fin and deployment of the fin in two phases. During the first phase the fin moves from the stowed position to a semi-deployed positions by rotation in the bearing about an axis normal to the projectile's centrally located axis. During the second phase the fin moves from the semi-deployed position to the deployed position by pivoting relative to the mounting.

One of the objects of the present invention is to provide foldable/collapsible wings, propellers, stabilizers and flight control surfaces to decrease the bulk of the UAV before use.

Yet another object of the present invention is to provide a UAV with foldable/collapsible wings, flight control surfaces, stabilizers and propellers to be fitted in a container/bag, tube launcher or a UAV rack that is small and lightweight enough to be man-portable.

Yet another object of the present invention is to provide a UAV with foldable/collapsible wings, flight control surfaces, stabilizers, propellers and means to control and drive the wings, flight control surfaces, stabilizers, propellers and flight control surface in a way that the UAV can do rapid flights and rapid maneuvers/speed changes when the deployed UAV is in a flight state.

Yet another object of the present invention is to provide a UAV with foldable/collapsible wings that can be fitted to a tube and to be man-portable even when the wings widths are wider than the width or diameter of the UAV's fuselage.

Other objects, advantages and features of the present invention will become apparent from the following detailed description of the invention when considered in conjunction with the accompanying drawings.

SUMMARY OF THE INVENTION

The present invention relates to a lightweight unmanned air vehicle (UAV), more particularly the present invention relates to collapsible and/or foldable wings, tail, propeller and control surfaces positioned on the UAV's fuselage.

In accordance with an embodiment of the present invention there is provided an unmanned air vehicle (UAV) having a fuselage. The UAV further includes a foldable propulsion means to generate thrust leading to the UAV movement. A driving means to drive the propulsion means. A plurality of flight control surfaces actuators is further included. The UAV further includes at least one pair of foldable wings where the rear portion of the wings is pivotally attached to the fuselage. The wings having at least one roll control surface hinged to at least one of the foldable wings. At least a pair of tail stabilizers having ruddervators flight control surfaces hinged to the tail stabilizers.

wherein, in a fully extended position or in ready to fly state position, each of the foldable wings are deployed perpendicular to one another and perpendicular to the fuselage to form an offset-x shaped wings, and in a stowed position, each of the wings are positioned parallel to one another and positioned parallel to the fuselage.

In accordance with another aspect of the present invention the tail foldable control surfaces and the foldable stabilizers in a fully extended position or in ready to fly state position, each of the foldable stabilizers along with their respective tail foldable control surface are deployed perpendicular to one another and perpendicular to the fuselage to form an offset-x shaped tail.

BRIEF DESCRIPTION OF THE DRAWINGS

The invention may be understood upon reading of the following detailed description of non-limiting exemplary embodiments thereof, with reference to the following drawings, in which.

The following detailed description of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF EMBODIMENTS OF THE INVENTION

Figure 1:
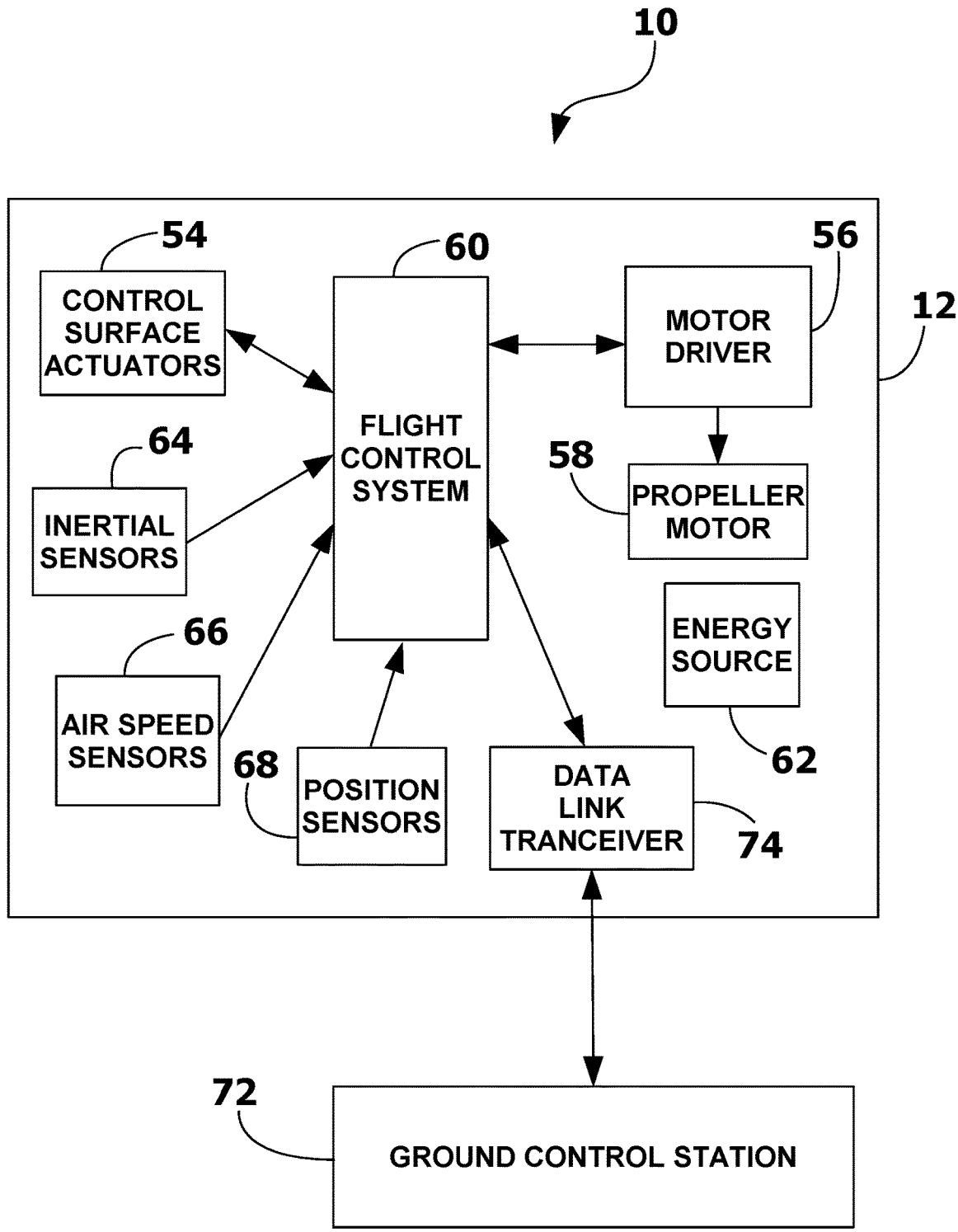
FIG. 1 is a schematic block diagram of an unmanned air vehicle (UAV) control system in accordance with some embodiments of the present invention.

Referring to FIG. 1, an unmanned air vehicle (UAV) control system 10 typically includes a UAV 12 and a ground station 14 for controlling operation of the UAV.

Figure 3:
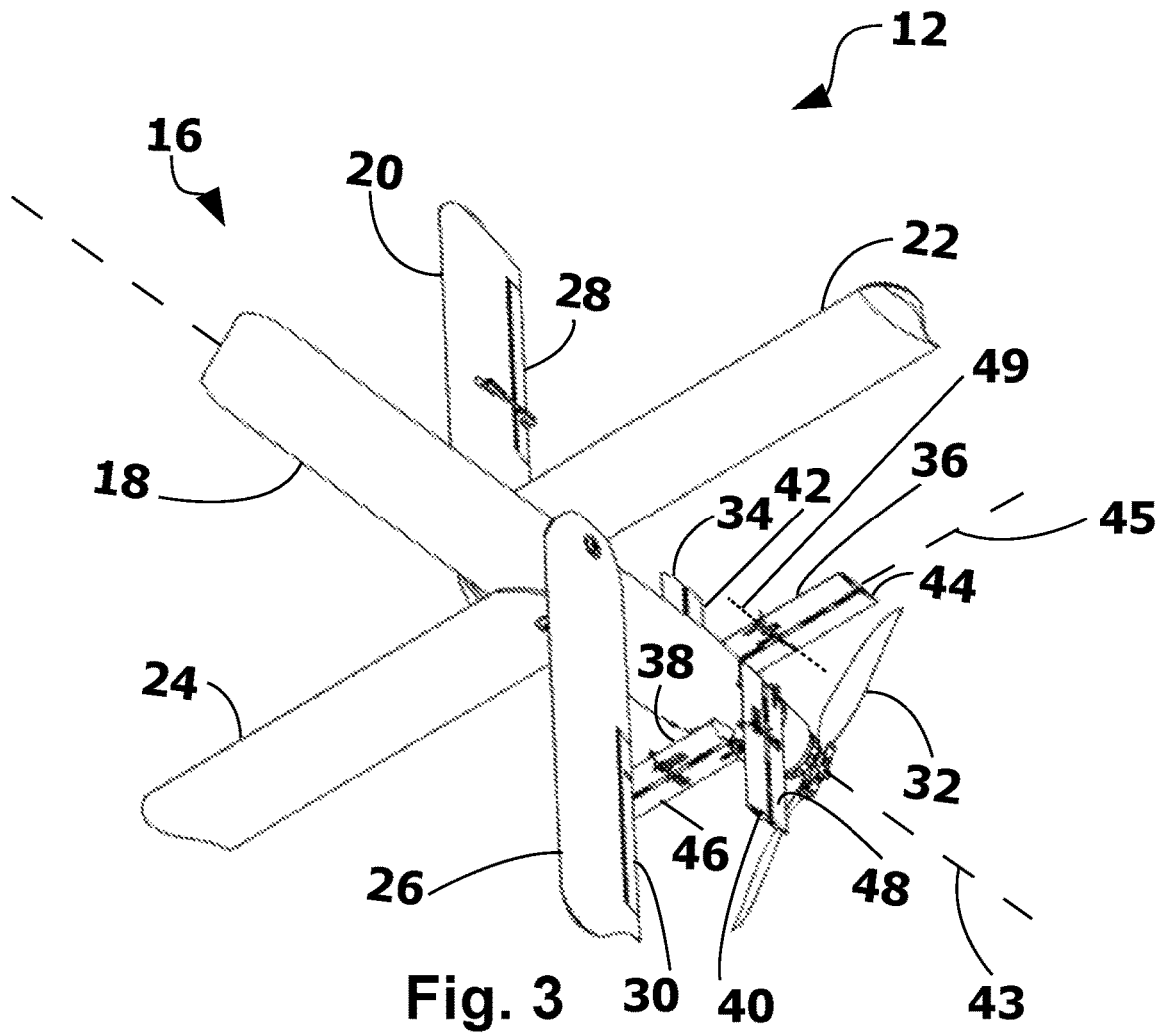
FIG. 3 is a perspective front view of a UAV according to the present invention in a ready flight state.

Referring also to FIG. 3, the UAV typically includes an airframe 16, which include fuselage 18 and foldable wings 20, 22, 24, 26 attached to the fuselage and include control surfaces 28 and 30. In some embodiments of the present invention the wings may have an asymmetrical cross sectional airfoil shape. The UAV further include a propulsion device such as but not limited to foldable propellers 32 connected to the shaft of an electric motor for propelling the UAV. The UAV further includes foldable stabilizers 34, 36, 38, 40 and foldable control surfaces 42, 44, 46 and 48.

The configuration of the foldable wings 20, 22, 24, 26, foldable stabilizers 34, 36, 38, 40 and foldable control surfaces 42, 44, 46, 48 of the invention may be applied to variety types and shapes of air vehicles or missiles, those skilled in the art of aerodynamic know the dimensions such as wings thickness and lift requirements for the variety types of air vehicles or missiles.

In the UAV's fuselage 18 typically include control surface actuators 54 for operating the flight control surfaces 28, 30, 42, 44, 46 and 48. Flight control surfaces 28 and 30 are referred as aileron which each of them is a hinged flight control surface attached to the trailing of wings 26 and 20. The ailerons are used typically in pair to control the UAV in roll (or movement around the UAV's longitudinal axis 43). Flight control surfaces 42, 44, 46 and 48 referred to as ruddervators which combine the tasks of the elevators and rudder. Each of the foldable flight control surfaces 42, 44, 46 and 48 is longitudinally hinged to the rear of the UAV's foldable stabilizers 34, 36, 38, 40 respectively and may have a limited angle of rotation around the longitudinal axis when the aforementioned surfaces and stabilizers are in a fully deployed state. For example longitudinal axis is designated in dashed line 45 for stabilizer 36 and flight control surface 44. In accordance with some embodiments of the present invention each of the foldable stabilizers 34, 36, 38, 40 and foldable flight control surfaces 42, 44, 46 and 48 is formed from two rigid sections hinged in the transverse axis for example axis 49 designated by a dashed line. The stabilizer rear portion of the first section is attached to the rear portion of fuselage 18. In a folded position the second section is folded around the transverse axis in approximately 90 degrees towards the fuselage 18 in respect to the first section as shown for example in FIG. 2.

The UAV further includes a motor driver 56 to drive the propeller motor 58, an image sensor/camera may be included (not shown) for imaging for example ground-based objects, a flight control system 60 for controlling the flight operation of the UAV 10. All of the electrical components are powered by an energy source 62 such as but not limited to charged batteries. The UAV's fuselage 18 may further include inertial sensors 64 incorporating accelerometers and gyros, for providing orientation measurements and readings, including pitch angle, roll angle and heading of the UAV and inertial measurements, including acceleration and angular rates of the UAV.

The UAV's fuselage 18 further includes air speed sensors 66 for sensing the speed of the UAV 10. The UAV's fuselage further includes position sensor 68 such as but not limited to global position sensor (GPS) receiver 70 for sensing the latitude, longitude and height of the UAV 10. The camera and other components such as but not limited to electronic components and electro mechanic components of the UAV can be controlled and transmit/receive data by ground control station 72 via the data-link transceiver which allows high-performance communications between the UAV and the ground control station. The UAV may also include weaponry such as but not limited to warheads (not shown).

In operation, the flight control system 60 under the control of flight control software, senses the flight control sensors and moves the control surfaces using the control surface actuators to maintain the UAV on a desired trajectory. The UAV can be guided to its target via the camera and can also be directed to coordinates using the Global Positioning System (GPS).

Figure 2:
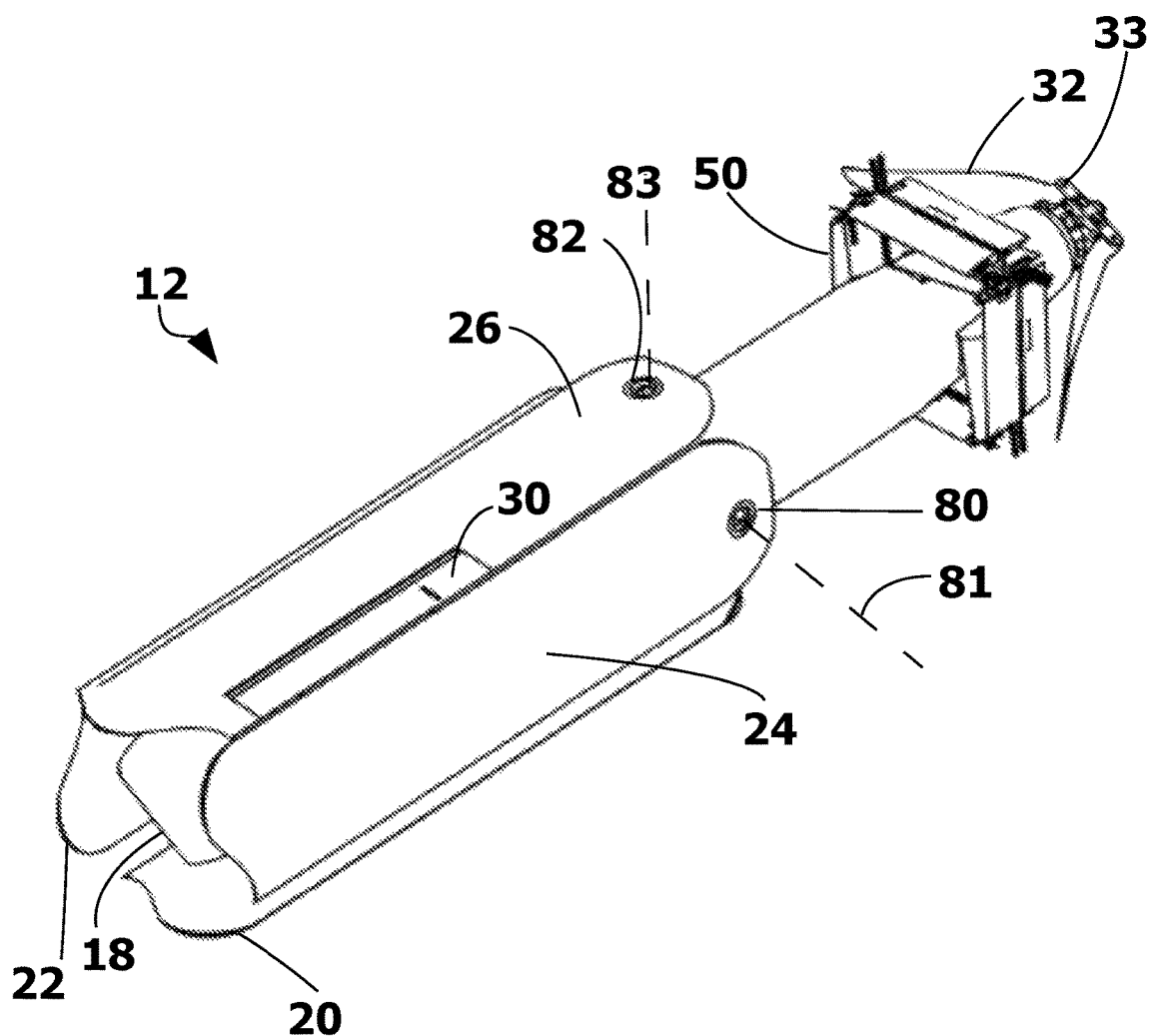
FIG. 2 is a perspective front view of a UAV according to the present invention in a collapsed/foldable or stowed state.
Figure 4:
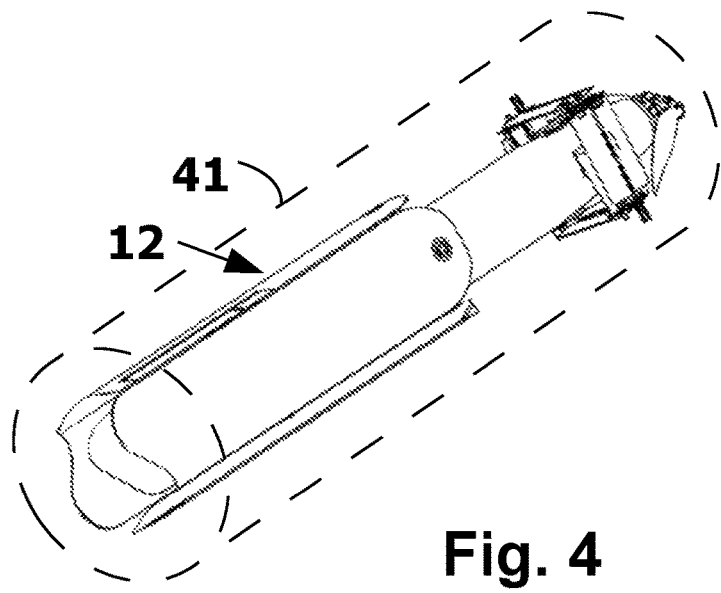
FIG. 4 is a perspective front view of a UAV according to the present invention in a collapsed/foldable or stowed state and fitted within a container/bag or in a launcher tube.

Referring to FIGS. 2 and 4, illustrate the UAV 12 in its stowed configuration in FIG. 2 and within a tubular container or a tubular launcher 41 schematically shown in FIG. 4. For the purpose for example of conserving stowage space, when stowed, the wings lie stowed parallel to the fuselage 18, wings 24 and 22 lies on the fuselage 18 opposite to one another and wings 26 and 20 lies on the fuselage 18 opposite to one another. For the purpose of conserving stowage space, each of the tail stabilizers 34, 36, 38, 40 and control surfaces ruddervator 42, 44, 46 and 48 are arranged folded such that approximately half section of each of the tail stabilizers 34, 36, 38, 40 and control surfaces 42, 44, 46 and 48 is folded approximately 90 degrees in respect to the second half of the tail stabilizers and the control surfaces so as to provide the overlapped pattern shown for example in FIGS. 3 and 4 where a folded half section overlaps half section tail of a neighbor half section tail which is not the neighbor's foldable section. Propellers 32 are folded around their pivots 33 towards the fuselage 18 as shown for example in FIG. 2.

Referring to FIG. 3, in a fully deploy position or in ready to fly state, set of hinged wings 24 and 26 are perpendicular to one another and set of hinged wings 20 and 22 are perpendicular to one another. Hinged wings 22 and 24 are parallel to one another and hinged wings 20 and 26 are parallel to one another. When the stabilizers and the ruddervators is in a fully deployable position set of stabilizers 38, 40 and their correspondence ruddervators 46 and 48 are arranged to be perpendicular to one another. Set of stabilizers 34, 36 and the correspondence ruddervators 42 and 44 are arranged to be perpendicular to one another. stabilizers 38, 36 and their correspondence ruddervators 46 and 44 are parallel to one another and stabilizers 34, 40 and the correspondence ruddervators 42 and 48 are parallel to one another as shown for example in FIG. 3. Propellers 32 are deployed around their pivots 33 up to 90 degrees in respect to the fuselage longitude axis 43.

All the foldable components described hereinabove in some embodiments of the present invention can be manually deployed and folded. All the foldable components described hereinabove in some embodiments of the present invention can be detachable from said fuselage 18. In some embodiment of the present invention all of the foldable components described hereinabove can be automatically controlled for example by the flight control system 60 or can be remotely operated from the ground control station 72. In some embodiments of the present invention all of the foldable components that were described hereinabove can be automatically deployed after being launched in a stowed position for example from a tube launcher.

In operation, for deploying the UAV from a stowed state to flight state, wing 24 pivotally connected for example by a pivot pin or rivet 80. Thereby, wing 24 rotates around axis 81 of pivot pin 80 for example counterclockwise until the wing is positioned perpendicular to the UAV fuselage/body 18 in a fully extended position as shown in FIG. 3. Wing 26 pivotally connected for example by a pivot pin or rivet 82. Thereby, wing 26 rotates around axis 83 of pivot pin 82 for example clockwise until the wing is positioned perpendicular to the UAV fuselage/body 18 in a fully extended position as shown in FIG. 3. The same deploy operation is provided for wings 20 and 22. In a fully deployed position each wing is arranged to be perpendicular to the UAV's fuselage/body 18 and each wing is arranged also perpendicular to its adjacent wing as shown in FIG. 3. Such fully deployable position or wings position in a ready to flight state as shown for example in FIG. 3 is referred herein as an offset Z-shaped wings arrangement. A locking mechanism as known in the mechanical art can be used to place the foldable wings in a fully deployed position and to maintain the offset Z-shaped wings during flight.

To deploy the tail stabilizers 34, 36, 38, 40 and control surfaces ruddervator 42, 44, 46 and 48 as shown in FIG. 2, the rotatable sections of the stabilizers and ruddervators rotate around their respective transverse axis until the hinge of the first section aligns with the second section as shown in FIG. 2. Such an arrangement in a fully deployed position referred herein as offset-x shaped tail. After the offset-x tail is arranged a suitable latching means or locking means as known in the prior art can be used to maintain the offset-x shaped tail even when the UAV of the present invention is making a sharp flight maneuvers.

Figure 5A:
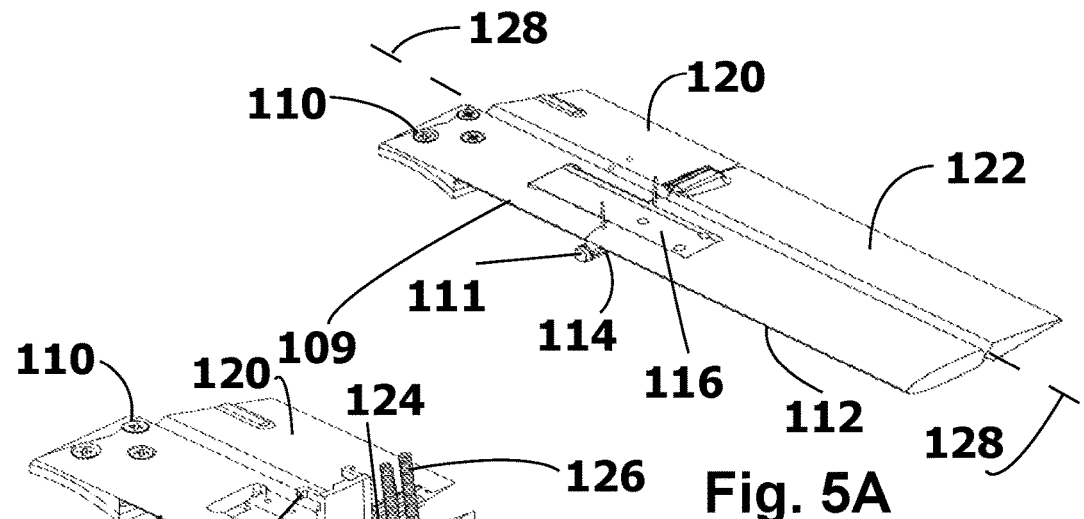
FIG. 5A is a perspective view of one of the UAV tails in accordance with some embodiment of the present invention in a fully deployed position.
Figure 5B:
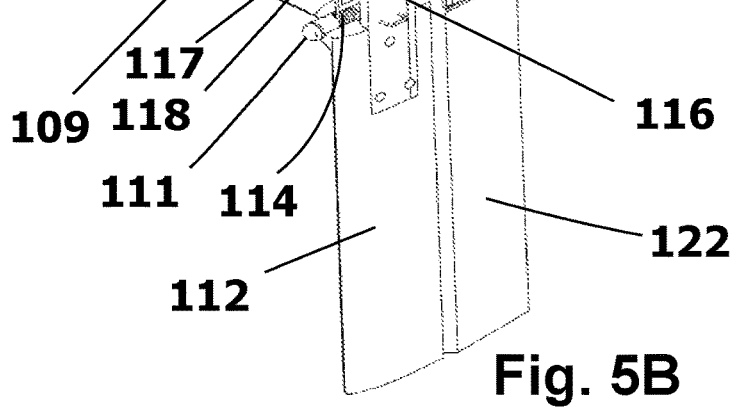
FIG. 5B is a perspective view of one of the UAV tails as shown in FIG. 5A in a collapsed/foldable or stowed state.

Referring to FIGS. 5A and 5B, the first section 109 of each of the stabilizers 34, 36, 38 and 40 that are shown for example in FIG. 3 is connected to the fuselage 18 for example as shown in FIG. 3 and is fastened thereto for example by bolts 110. The second section 112 of each of the stabilizers 34, 36, 38 and 40 is hinged connected 111 to the first section 109. The hinge 111 may include a spring 114 that draws the second section 112 to rotate counter clockwise such that the stabilizers rotate from a foldable position as shown in FIG. 5B to a deployable position as shown in FIG. 5A. From the second section 112 of the stabilizers extends a flat surface 116 that fits into a groove or recess 117 constructed on the first section 109 of the stabilizers for example as shown in FIG. 5B. The flat surface 116 further include latches 118 to lock the first section 109 with the second section 112 and thus preventing the second section 112 to fold when the sections 109 and 112 are in fully deployed position as shown for example in FIG. 5A.

Each of the ruddervator 42, 44, 46 and 48 also include two sections 120 and 122. The first section 120 is longitudinally hinged to the first section 109 of the stabilizers 34, 36, 38 and 40. The second section 122 is longitudinally hinged to the second section of the stabilizers 34, 36, 38 and 40. The first section 120 and the second section 122 include holes 124 through which spring 126 at each hole is inserted (in order to show the springs, in FIG. 5B the springs are not shown inserted within holes of the first section 120 although they should be in operation). The inserted springs 126 urge the second sections 112 and 122 of both the stabilizers and the ruddervator to rotate to a fully deployed position. In addition in a fully deployed position the springs maintain an alignment along the longitude axis 128 between the first section 120 and the second sections 122 of the ruddervators as shown for example in FIG. 5A. These springs' arrangement enables the two sections 122, 120 to rotate around axis 128 as one piece.

Figures 6A, 6B:
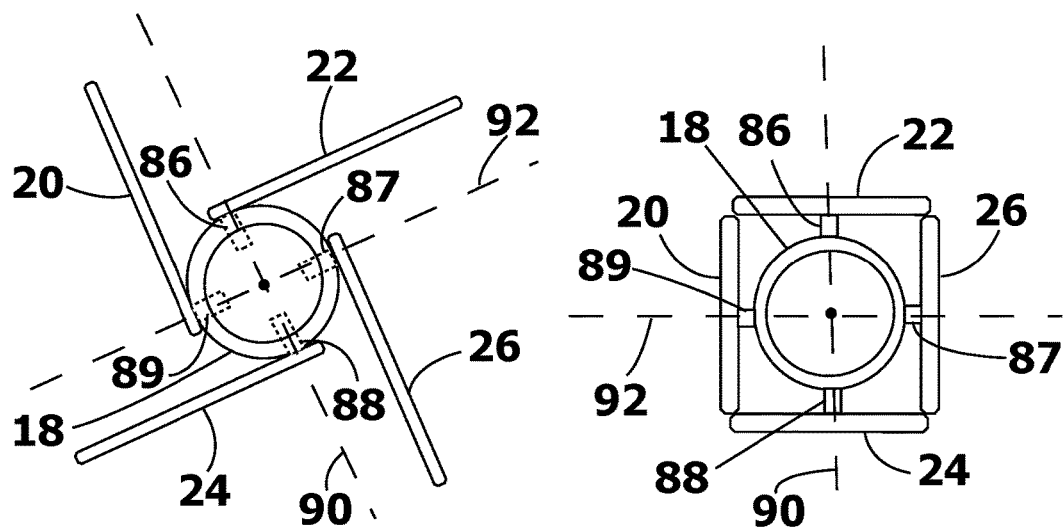
FIG. 6A is a schematic front view of an unmanned air vehicle (UAV) in accordance with some embodiments of the present invention in a ready flight state.
FIG. 6B is a schematic front view of an unmanned air vehicle (UAV) in accordance with some embodiments of the present invention in a collapsed/foldable or stowed state.

Referring now to FIGS. 6A and 6B, in accordance with some embodiment of the present invention in particular when the width of the foldable wings 20, 22, 24 and 26 are wider than the width or diameter of the fuselage 18, a coupling mechanism means for example an axial pins 86, 87, 88, 89 where each of them combined with a spring and a latching means is used for coupling and latching the rotational axial wing portion to the fuselage as shown schematically in FIG. 6A. The coupling mechanism means is used also to decouple the wings when they are in a foldable/collapsible position as shown schematically in FIG. 6B.

The coupling of the rotational axial wing portion to the fuselage 18 in a fully deployed position for example as shown schematically in FIG. 6A is desirable in order to reduce wind gust about any axis of the UAV when the UAV is in a flight state.

In operation, when the foldable wings are folded from fully deployed position to a folded/stowed position, wings 24, 22 rotate around axis 90 and wings 20, 26 rotate around axis 92. When the foldable wings are folded from fully deployed position to a folded/collapsible position the axial pins 86, 87, 88, 89 extended outwardly from fuselage outer surface 18, thereby causing the wings 20, 22, 24, 26 to decouple to about the extended pin distance. On the opposite, when the wings 20, 22, 24, 26 are deployed towards the fully deployed position as shown for example schematically in FIG. 6A the pins 86, 87, 88, 89 return back to the non-extended position as shown schematically in FIG. 6A thereby, causing the wings to coupled again to the fuselage 18.

Figure 7A:
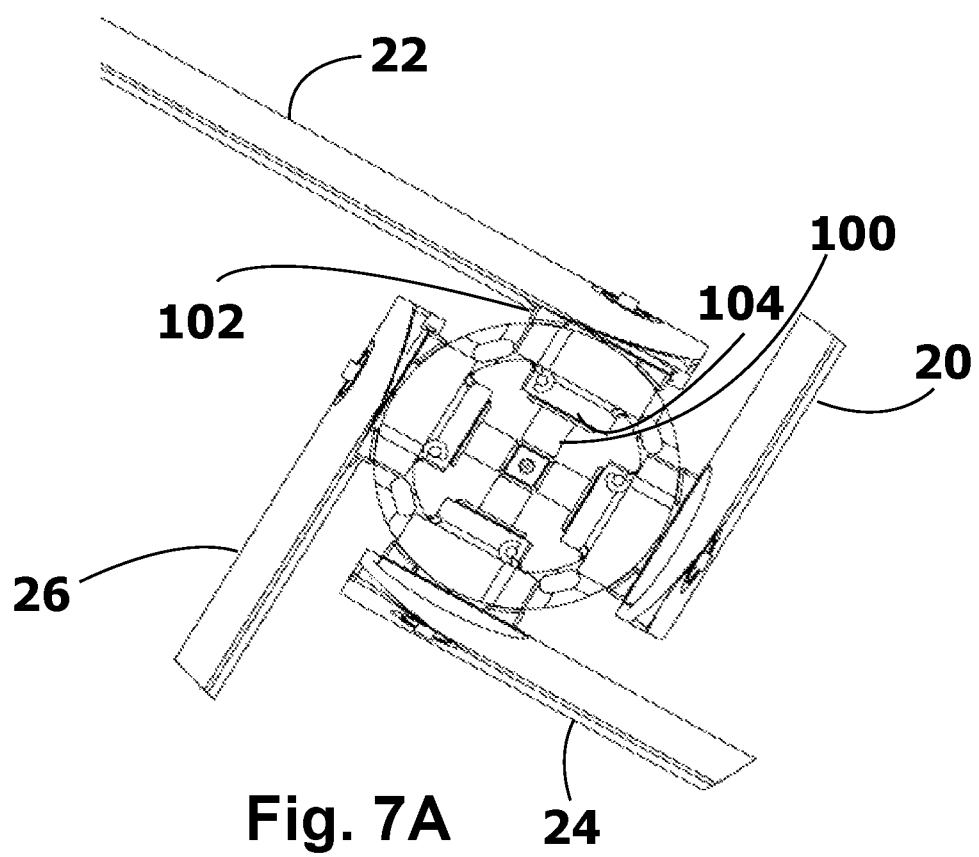
FIG. 7A is a sectional front view of an unmanned air vehicle (UAV) as shown for example in FIG. 3 in a ready to flight state.
Figure 7B:
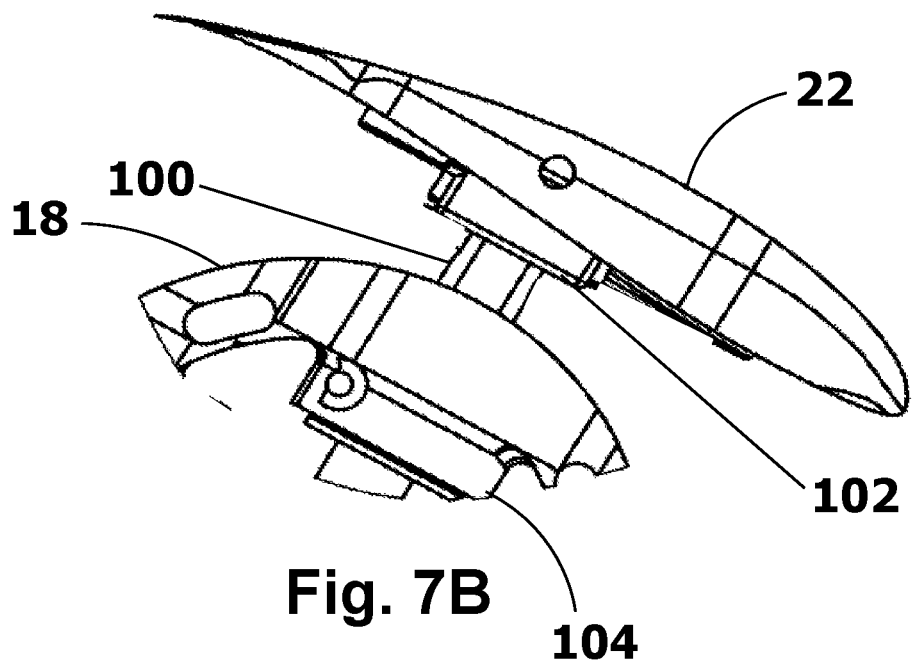
FIG. 7B is a sectional front view of an unmanned air vehicle (UAV) shown for example in FIG. 2 in a collapsed/foldable or stowed state.

Referring to FIGS. 7A and 7B there is shown another exemplary coupling mechanism means to couple the rear portion of the wings 22, 24, 26 and 20 to the fuselage 18 in a fully deployed position. The coupling mechanism means may used also to decouple the wings when they are in a foldable/collapsible position as shown in FIG. 7B. The coupling mechanism for each wing includes an external threaded rod 100 that fits to internal threaded sockets 102 and 104. Preferably, the threaded rod 100 may have a very aggressive thread pitch which means that the rod 100 is screwed in or out with just a few turns.

Threaded socket 104 is fastened to the inner surface of fuselage 18 as illustrated for example in FIG. 7A and threaded socket 102 is fastened to the bottom surface of the wing for example of wing 22 as shown in FIG. 7B. The coupling mechanism further includes a biasing means, not shown, such as a spring that urges the wing to turn to its fully deployed position and simultaneously the wing turns the rod 100 thereby the rod 100 screwed into the fuselage 18. The rod continues to screw until the socket 102 engages with the outer surface of fuselage 18 and a locking means, not shown locks the wings in its fully deployed position. When the wing is being folded the rod 100 rotates to the opposite direction and the rod is thus screwed outwardly until a locking means, not shown prevents the rod to continue screwed outwardly when the wings are in stowed or collapsible position.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. An unmanned aerial vehicle (UAV), comprising:
a fuselage defined around a longitudinally extending axis and having a substantially circular cross-section;
at least one pair of foldable wings pivotally attached to said fuselage, wherein each one of said at least one pair of foldable wings has at least one flight control surface hingedly attached to said at least one pair of foldable wings;
a plurality of flight control surface actuators for respectively controlling each one of said flight control surfaces mounted upon said at least one pair of foldable wings;
at least one pair of foldable tail stabilizers having ruddervator flight control surfaces hingedly attached to said at least one pair of tail stabilizers;
wherein, in a fully extended ready to fly state position, said at least one pair of foldable wings are fully deployed so as to be disposed parallel to one another and tangent to external surface portions of said substantially circular fuselage so as to form an offset Z-shaped set of wings with respect to each other, and when said at least one pair of foldable wings of said unmanned aerial vehicle (UAV) are disposed in a stowed position, said at least one pair of foldable wings are disposed parallel to said longitudinally extending axis of said fuselage; and
wherein, in a fully extended or ready to fly state position, said at least one pair of foldable tail stabilizers are fully deployed so as to be disposed parallel to one another and tangent to external surface portions of said substantially circular fuselage so as to form an offset Z-shaped set of tail stabilizers with respect to each other, and when said at least one pair of foldable tail stabilizers of said unmanned aerial vehicle (UAV) are disposed in a stowed position, said at least one pair of foldable tail stabilizers are disposed perpendicular to said longitudinally extending axis of said fuselage.

2. An unmanned aerial vehicle according to claim 1, wherein:
each one of said tail stabilizers, with said ruddervators, have longitudinal axes and comprise two sections wherein first sections of said stabilizer are attached to said fuselage while second sections of said stabilizers and said ruddervators are respectively hingedly connected to said first section along an axis transverse to said longitudinal axes; said second sections rotate around said transverse axes wherein, in a stowed position for the purpose of conserving stowage space, each one of said tail stabilizers and said ruddervator flight control surfaces are folded such that said second section of each one of said tail stabilizers and said ruddervators is folded approximately 90 degrees with respect to said first section of said tail stabilizers and the said control surfaces so as to be disposed in an overlapped array with respect to each other.

3. An unmanned aerial vehicle (UAV) according to claim 2, wherein:
said first sections and the second sections of said ruddervators include holes through which springs are inserted so as to urge said second sections of both said stabilizers and said ruddervators to rotate to fully deployed positions whereby when said second sections of said stabilizer and said ruddervators are disposed at said said fully deployed positions, said springs maintain said first sections and said second sections of said stabilizers and said ruddervators in alignment with respect to each other and along said longitudinal axes of said stabilizers and said ruddervators such that said first and second sections of said stabilizers and said ruddervators are effectively one piece.

4. An unmanned aerial vehicle (UAV) according to claim 1, wherein:
said wings have a symmetrical cross-sectional aerofoil shape.

5. An unmanned aerial vehicle (UAV) according to claim 1, wherein:
said wings have an asymmetrical cross-sectional aerofoil shape.

6. An unmanned aerial vehicle (UAV) according to claim 1, further comprising:
propulsion means comprising a propeller driven by a motor.

7. An unmanned aerial vehicle (UAV) according to claim 1, wherein:
said offset Z-shaped wings and said offset Z-shaped tail are detachable from said fuselage.

8. An unmanned aerial vehicle (UAV) according to claim 1, wherein:
said unmanned aerial vehicle (UAV) further includes a flight control system; and wherein said flight control surfaces disposed upon said offset Z-shaped wings and said offset Z-shaped tail are automatically controlled by said flight control system.

9. An unmanned aerial vehicle (UAV) according to claim 1, wherein:
said control surfaces on said offset Z-shaped wings and said offset Z-shaped tail are automatically controlled by controlling flight control surface actuators of said respective control surfaces by flight control system sensor readings and a global positioning system (GPS).

10. An unmanned aerial vehicle (UAV) according to claim 1, wherein:
said control surfaces disposed upon said offset Z-shaped wings and said offset Z-shaped tail are remotely controlled by an operator in a ground station.

11. An unmanned aerial vehicle (UAV) according to claim 1, further comprising:
propulsion means comprising a foldable propeller.

12. An unmanned aerial vehicle (UAV) according to claim 1, wherein:
when said unmanned aerial vehicle (UAV) is disposed in said stowed position, it can be installed inside of a container or a bag that can be carried so as to render said unmanned aerial vehicle (UAV) man-portable.

13. An unmanned aerial vehicle (UAV) according to claim 1, wherein:
said unmanned aerial vehicle (UAV) further comprises a foldable propulsion means to generate thrust leading to movement of said unmanned aerial vehicle (UAV), and a driving means to drive said propulsion means.

14. An unmanned aerial vehicle (UAV) according to claim 1, wherein:
when the width of said foldable wings are wider than the width or diameter of said fuselage, said UAV further comprises coupling mechanisms having axial pins combined with springs and latching mechanisms which permit said pins to be moved between extended and retracted positions;
said coupling mechanisms are attached to said fuselage and to each of said wings such that said wings can be disposed in said stowed position and in said fully deployed position;
wherein when said wings are disposed at said stowed positions, said pins extend outwardly from said fuselage such that said wings are disposed predetermined distances from said fuselage which are substantially equal to the lengths of said pins when said pins are at their extended positions; and
wherein when said wings are disposed at said fully deployed positions, said pins are disposed at said retracted positions such that said wings are disposed substantially tangent to said fuselage, thereby reducing the effects of wind gusts about any axis of said UAV when said UAV is in flight.

* * * * *